No. 647,710. Patented Apr. 17, 1900.
J. D. SWINDELL.
MOUNTING FOR CARRIAGES, &c.
(Application filed May 27, 1898. Renewed Dec. 1, 1899.)
(No Model.) 2 Sheets—Sheet 2.
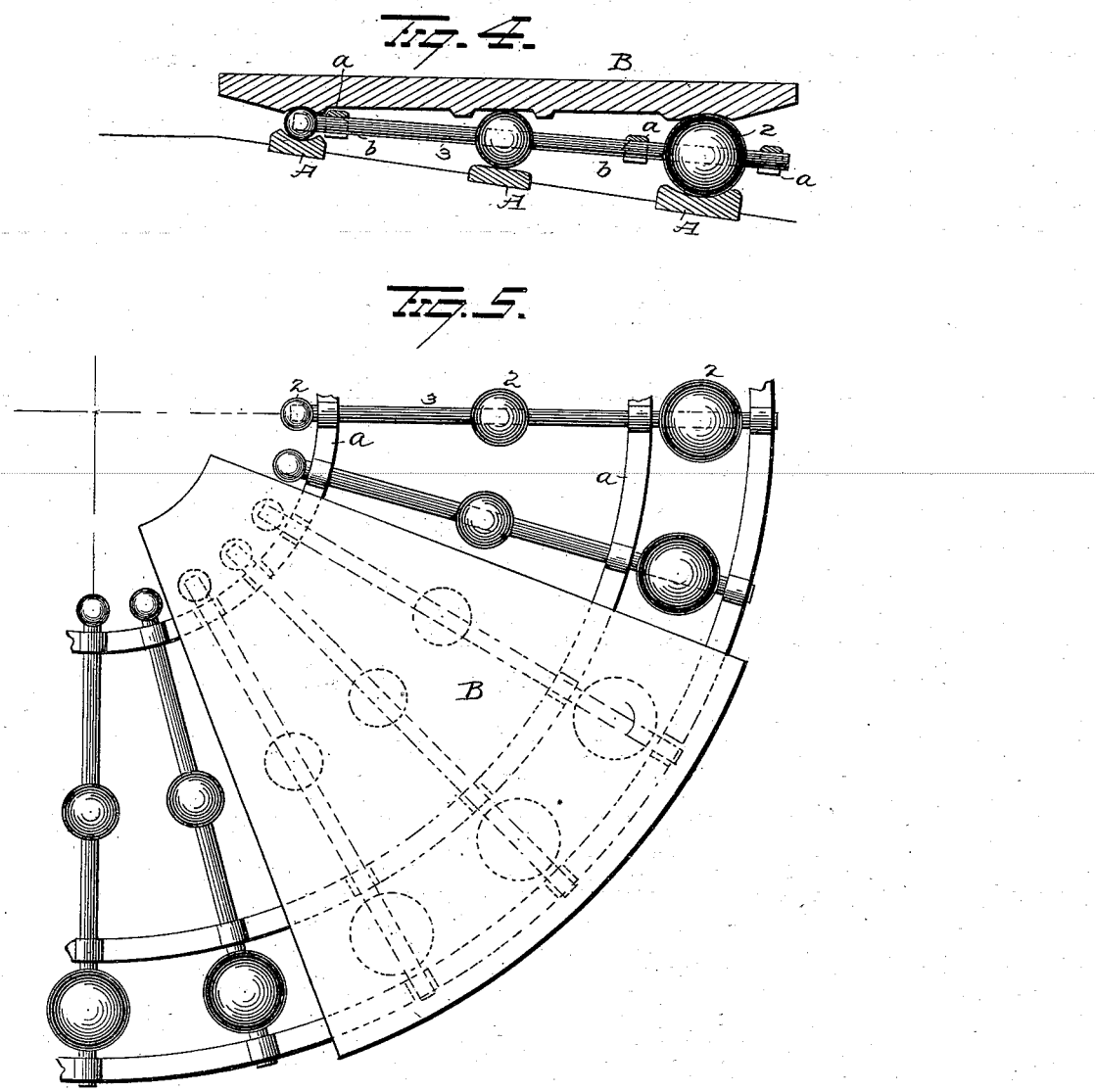
WITNESSES
G. S. Nottingham
G. F. Downing
INVENTOR
J. D. Swindell
By H. A. Seymour
Attorney

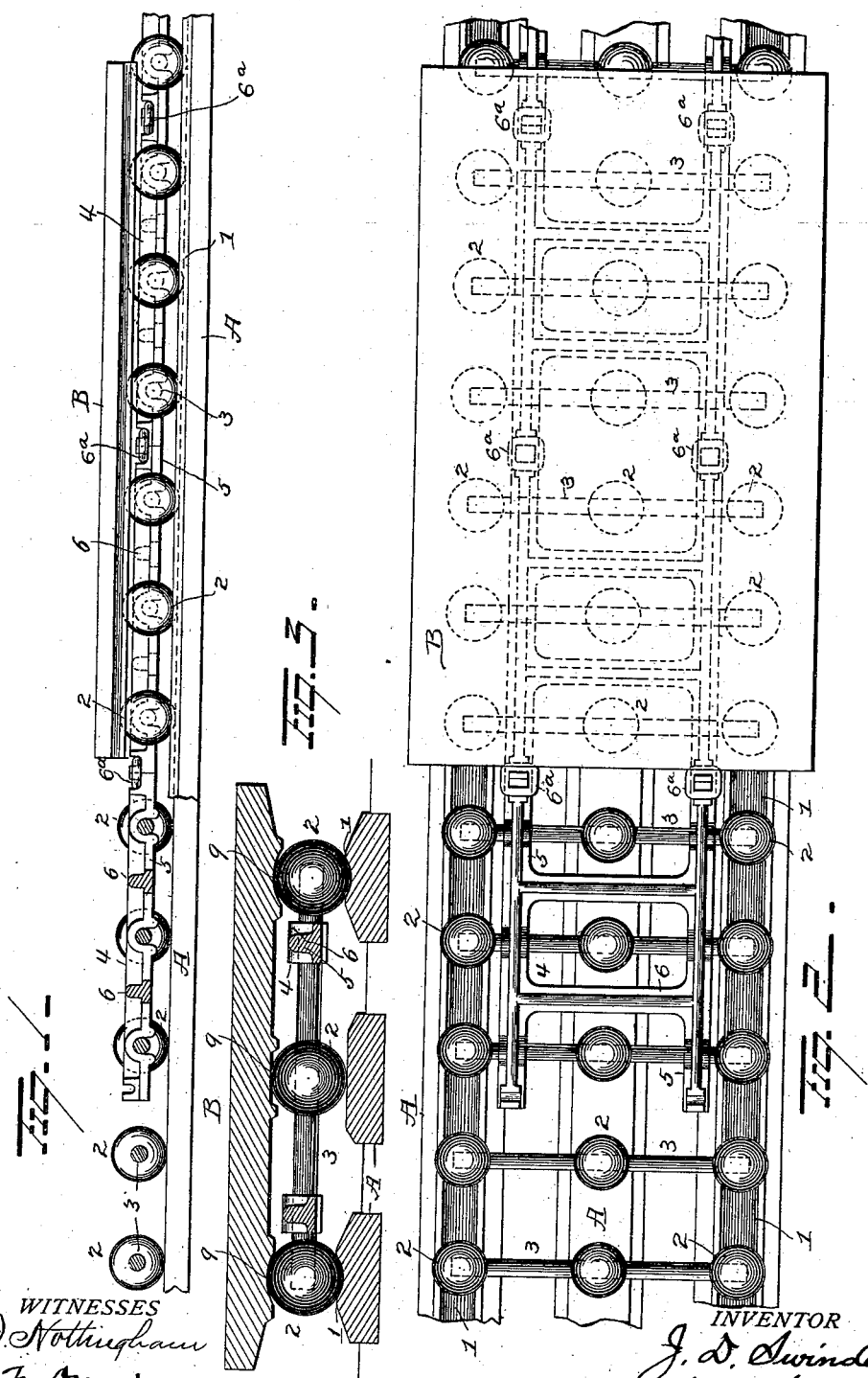

UNITED STATES PATENT OFFICE.

JAMES D. SWINDELL, OF PITTSBURG, PENNSYLVANIA, ASSIGNOR OF THREE-FOURTHS TO FRANK FELKEL, OF SAME PLACE, JAMES H. SWINDELL, OF ALLEGHENY, AND GEORGE GREER, OF NEW CASTLE, PENNSYLVANIA.

MOUNTING FOR CARRIAGES, &c.

SPECIFICATION forming part of Letters Patent No. 647,710, dated April 17, 1900.

Application filed May 27, 1898. Renewed December 1, 1899. Serial No. 738,912. (No model.)

*To all whom it may concern:*

Be it known that I, JAMES D. SWINDELL, a resident of Pittsburg, in the county of Allegheny and State of Pennsylvania, have invented certain new and useful Improvements in Mountings for Carriages, &c.; and I do hereby declare the following to be a full, clear, and exact description of the invention, such as will enable others skilled in the art to which it appertains to make and use the same.

My invention relates to an improvement in mountings for carriages, cars, and other movable load-sustaining apparatus, the objects of the invention being to so construct and arrange mountings for the purpose stated as to reduce friction to a minimum, so that they shall constitute but few parts, which will be simple in construction, easily operated, and so that the carriage or other device shall be permitted to move smoothly and freely.

With these objects in view the invention consists in certain novel features of construction and combinations and arrangements of parts, as will be more fully hereinafter described, and pointed out in the claims.

In the accompanying drawings, Figure 1 is a side view, partly in section, illustrating the application of my invention to a railway-carriage. Fig. 2 is a plan view, and Fig. 3 is a view in section, of the same. Figs. 4 and 5 are views illustrating the application of my invention to a turn-table.

A represents parallel rails, the outer rails being preferably made with concave recesses 1 1 in their upper faces. The rails A are adapted to receive thereon and constitute bearings for several series of balls or rollers 2, each series comprising as many balls as there are rails. In the drawings I have shown three, preferably secured together by a shaft 3, which is adapted to turn with them, or, if desired, the balls may be mounted loosely on the shaft.

A frame 4, composed of parallel longitudinal bars or sections 5 and cross-bars 6, secured to the longitudinal sections, is mounted on several shafts intermediate of the ends of the latter. Several such frames are provided and connected together by means of links 6$^a$.

The side bars 5 of each frame are provided with recesses for the reception of the shafts 3, whereby to retain the several sets properly spaced apart.

A carriage or platform B is mounted on the balls and provided with parallel grooves 9 on its lower face adapted to receive the balls and form bearings therefor.

It will be seen from the above description that when the carriage or platform B is loaded it can be easily moved on the balls with the expenditure of a minimum amount of power and that frictional resistance will be greatly minimized and that the platform will move a great deal faster than the balls.

When my improvements are applied to a turn-table, I use the form disclosed in Figs. 4 and 5. In this form the balls are of varying sizes, the largest balls being at the outer edge, the next smaller in the middle, and the smallest balls on the inner track. The frame for maintaining the series of balls properly spaced apart comprises three circular sections $a$—the outer section on the shafts which extend outside the outer end of the outside balls, another section on the shafts just on the inner edge of the outer balls, and the inner circular portion near the smallest balls, each circular section having recesses $b$ for the reception of the shafts. The different sizes of the balls will permit of the easy turning of the turn-table, and the rails on which said balls are adapted to move will be raised and lowered to permit the platform to rest level.

I do not wish to limit myself to any particular number of tracks or balls therefor, as the number of tracks and balls will depend altogether on the use to which the mounting is put.

My invention is particularly useful for charging carriages of annealing and other furnaces, for gun-carriages, for turn-tables, for locomotives, for drawbridges, as roller feed-conveyers, and for many other purposes.

Various slight changes might be made in the general form and arrangement of the several parts described without departing from the spirit and scope of my invention—as, for instance, I might provide a series of balls on top of the platform and a second platform on top of the upper balls, whereby when the lower platform is moved the upper platform can be moved in the opposite direction as desired—and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. The combination with a base and a platform, of several series of balls or rollers disposed between said base and platform, a shaft mounted in and carried by the balls or rollers of each series, and a frame consisting of parallel bars disposed on and supported by said shafts, said bars being located in proximity to the balls or rollers at the respective ends of said shafts and having recesses for the reception of the shafts, substantially as set forth.

2. The combination with a base and a platform, of several series of balls or rollers disposed between said base and platform, a shaft mounted in and supported by the balls or rollers of each series, and a frame mounted on and supported by the series of shafts, said frame consisting of parallel bars connected together and having recesses for the reception of the shafts, substantially as set forth.

3. The combination with a base and a platform, of several series of balls disposed between said base and platform, a shaft mounted in and supported by the balls of each series and a series of frames mounted on the shafts near the respective ends thereof and having recesses for the reception of said shafts, and links coupling said frames together, substantially as set forth.

In testimony whereof I have signed this specification in the presence of two subscribing witnesses.

JAMES D. SWINDELL.

Witnesses:
JAS. H. SWINDELL,
FRANK FELKEL.